US007755971B2

(12) United States Patent
Heatley et al.

(10) Patent No.: US 7,755,971 B2
(45) Date of Patent: Jul. 13, 2010

(54) SENSING SYSTEM

(75) Inventors: David J T Heatley, Felixstowe (GB);
Jane E Tateson, Woodbridge (GB);
Christopher M Roadknight,
Woodbridge (GB); Mark A Shackleton,
Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 13 days.

(21) Appl. No.: 11/885,400

(22) PCT Filed: Mar. 2, 2006

(86) PCT No.: PCT/GB2006/000759

§ 371 (c)(1),
(2), (4) Date: Aug. 30, 2007

(87) PCT Pub. No.: WO2006/092611

PCT Pub. Date: Sep. 8, 2006

(65) Prior Publication Data

US 2008/0219093 A1    Sep. 11, 2008

(30) Foreign Application Priority Data

Mar. 4, 2005    (GB) .................................. 0504579.4

(51) Int. Cl.
*G01V 1/38*    (2006.01)
*H04B 11/00*    (2006.01)
(52) U.S. Cl. ........................................ 367/16; 367/134
(58) Field of Classification Search .................... 367/15, 367/16, 17, 18, 19, 20
See application file for complete search history.

(56) References Cited

U.S. PATENT DOCUMENTS

| 4,297,887 A | 11/1981 | Bucaro |
| 4,397,551 A | 8/1983 | Bage et al. |
| 4,443,700 A | 4/1984 | Macedo et al. |
| 4,463,451 A * | 7/1984 | Warmack et al. .............. 367/16 |

(Continued)

FOREIGN PATENT DOCUMENTS

EP    0 251 632 A2    1/1988

(Continued)

OTHER PUBLICATIONS

International Search Report mailed May 29, 2006 in PCT/GB2006/000759.

(Continued)

*Primary Examiner*—Scott A Hughes
*Assistant Examiner*—Krystine Saito
(74) *Attorney, Agent, or Firm*—Nixon & Vanderhye P.C.

(57) ABSTRACT

The present invention relates to a sensing system, in particular to sensing system for sensing undersea seismic events. A vibration sensor is provided for sensing seismic vibrations on the sea bed is provided. The vibration sensor is electrically coupled to a transmitter unit, the transmitter unit being arranged to transmit, in use, an acoustic wave from which the presence of a seismic vibration can be inferred. The acoustic wave modulates light travelling along a nearby optical cable, the modulation being recovered at a distant monitoring station. A flotation arrangement is provide for retaining the transmitter unit in a raised position relative to the sea bed to facilitate the coupling of the acoustic wave to the optical cable.

21 Claims, 2 Drawing Sheets

U.S. PATENT DOCUMENTS

| | | |
|---|---|---|
| 4,538,103 A | 8/1985 | Cappon |
| 4,572,949 A | 2/1986 | Bowers et al. |
| 4,593,385 A | 6/1986 | Chamuel |
| 4,649,529 A * | 3/1987 | Avicola .................. 367/149 |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A * | 2/1989 | Ishii et al. ............... 367/134 |
| 4,847,596 A | 7/1989 | Jacobson et al. |
| 4,907,856 A | 3/1990 | Hickernell |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,046,848 A | 9/1991 | Udd |
| 5,051,965 A * | 9/1991 | Poorman .................. 367/149 |
| 5,093,568 A | 3/1992 | Maycock |
| 5,104,391 A | 4/1992 | Ingle et al. |
| 5,140,559 A | 8/1992 | Fisher |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,311,592 A | 5/1994 | Udd |
| 5,313,266 A | 5/1994 | Keolian et al. |
| 5,319,609 A * | 6/1994 | Regnault .................. 367/16 |
| 5,351,318 A | 9/1994 | Howell et al. |
| 5,355,208 A | 10/1994 | Crawford et al. |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,604,318 A | 2/1997 | Fasshauer |
| 5,636,021 A | 6/1997 | Udd |
| 5,637,865 A * | 6/1997 | Bullat et al. ........... 250/227.14 |
| 5,663,927 A * | 9/1997 | Olson et al. .................. 367/4 |
| 5,691,957 A * | 11/1997 | Spiesberger .................. 367/3 |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu et al. |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,194,706 B1 | 2/2001 | Ressl |
| 6,195,162 B1 | 2/2001 | Varnham et al. |
| 6,269,198 B1 * | 7/2001 | Hodgson et al. ............... 385/13 |
| 6,269,204 B1 | 7/2001 | Ishikawa |
| 6,285,806 B1 | 9/2001 | Kersey et al. |
| 6,315,463 B1 | 11/2001 | Kropp |
| 6,459,486 B1 | 10/2002 | Udd et al. |
| 6,594,055 B2 | 7/2003 | Snawerdt |
| 6,625,083 B2 * | 9/2003 | Vandenbroucke ............ 367/15 |
| 6,628,570 B2 | 9/2003 | Ruffa |
| 6,788,417 B1 | 9/2004 | Zumberge et al. |
| 6,859,419 B1 * | 2/2005 | Blackmon et al. ........... 367/134 |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 * | 6/2003 | Bary ............................ 367/16 |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2006/0256344 A1 | 11/2006 | Sikora et al. |
| 2007/0009600 A1 | 1/2007 | Edgren et al. |
| 2007/0065150 A1 | 3/2007 | Sikora et al. |
| 2007/0264012 A1 | 11/2007 | Healey et al. |
| 2008/0013161 A1 * | 1/2008 | Tokura et al. ............... 359/334 |
| 2008/0018908 A1 | 1/2008 | Healey et al. |
| 2008/0123085 A1 | 5/2008 | Sikora et al. |
| 2008/0166120 A1 * | 7/2008 | Heatley et al. ................. 398/33 |
| 2008/0219660 A1 | 9/2008 | Healey et al. |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0103928 A1 | 4/2009 | Healey et al. |
| 2009/0135428 A1 | 5/2009 | Healey |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |

OTHER PUBLICATIONS

Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004 , pp. 1381-1387, XP010776555; Internet version, Oceans 2004, Kobe, Japan, pp. 1-7, Redmond, WA USA.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.

U.S. Appl. No. 11/663,957, filed Mar. 28, 2007, Healey et al.
U.S. Appl. No. 11/885,275, filed Aug. 29, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report mailed Dec. 1, 2005 in PCT/GB2005/003680.
International Search Report dated Dec. 16, 2005 in PCT/GB2005/003594.
International Search Report mailed Jan. 14, 2005 in International Application No. PCT/GB2004/004169.
International Search Report mailed May 8, 2006 in PCT/GB2006/000750.
International Search Report mailed Jun. 30, 2006, dated Jun. 7, 2006, in PCT/GB2006/001173.
International Search Report mailed Jul. 17, 2007 for PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report mailed May 2, 2007 in PCT/GB2007/000359.
UK Search Report dated Dec. 4, 2003 in GB Application No. GB 0322859.0.
UK Search Report dated May 24, 2005 in GB506591.7.
International Search Report dated May 16, 2006 in PCT/GB2005/004850.
International Search Report dated Mar. 15, 2006, mailed Mar. 24, 2006 in PCT/GB2005/004873.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Security, Military University of Technology, IEEE 2001, pp. 142-148.
"Fading Rates in Coherent OTDR," Electronics Letters, vol. 20, No. 11, May 24, 1984.

* cited by examiner

→ = Acoustic Signal Path
○ = Sensor

SENSING SYSTEM

This application is the US national phase of international application PCT/GB2006/000759 filed 2 Mar. 2006 which designated the U.S. and claims benefit of GB 0504579.4, dated 4 Mar. 2005, the entire content of which is hereby incorporated by reference.

BACKGROUND

Technical Field of Example Embodiments

The present invention relates to an undersea seismic sensing system, in particular to an undersea seismic sensor system including a flotation arrangement.

BRIEF SUMMARY OF EXAMPLE EMBODIMENTS

According to one aspect of the present invention, there is provided an undersea seismic sensing system including: a vibration sensor for sensing seismic vibrations on the sea bed; a transmitter unit coupled to the vibration sensor, the transmitter unit being arranged to transmit, in use, an acoustic wave from which the presence of a seismic vibration can be inferred; and, a flotation arrangement for retaining the acoustic transmitter unit in a raised position relative to the sea bed.

BRIEF DESCRIPTION OF THE DRAWINGS

Further aspects of the invention are provided in the claims. The invention will now be further described, with reference to the following drawings in which:

DETAILED DESCRIPTION OF EXAMPLE EMBODIMENTS

Figure 1:
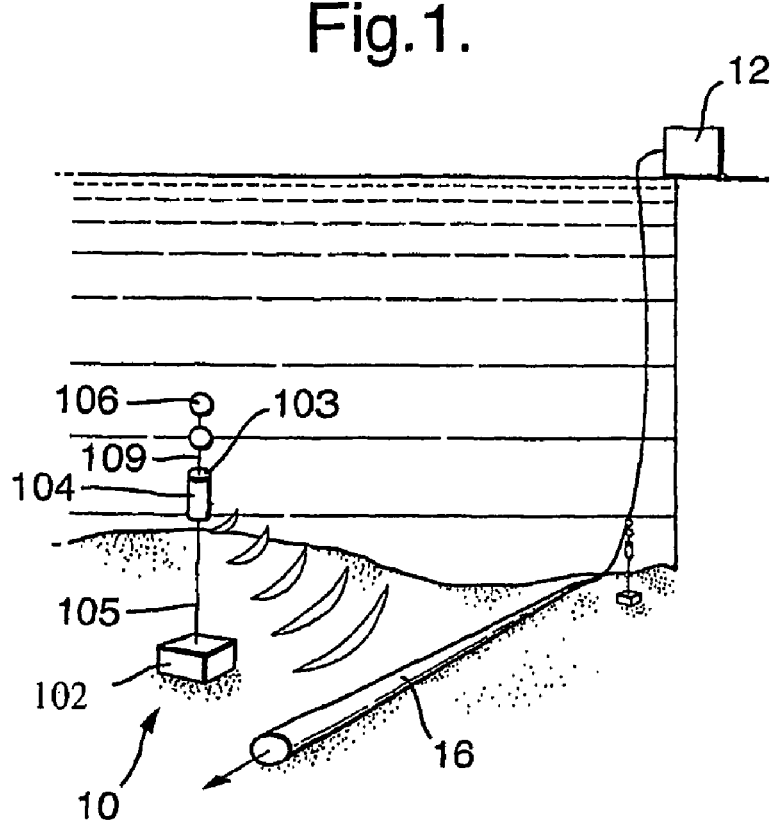
FIG. 1 shows a communications system according to the present invention
Figure 3:
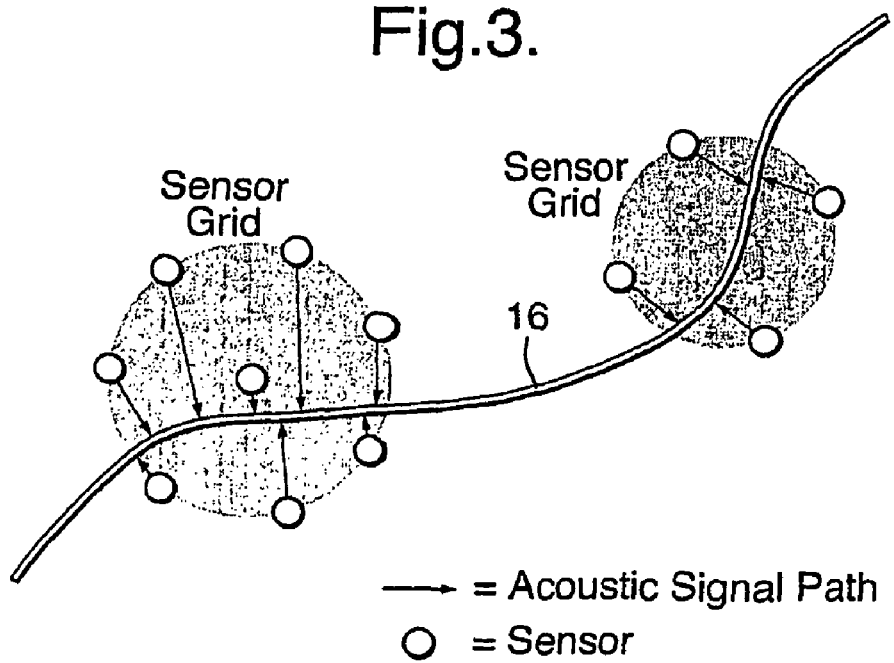
FIG. 3 shows a sensor network

In FIG. 1, an sub sea optical cable 16 extends along the sea bed. A sensor 102 on the sea bed is electrically coupled to an acoustic transmitter 104 such that information signals indicative of a sensed seismic event can be transmitted by the transmitter trough the water in the form of acoustic waves or other disturbances. The acoustic disturbances modulate light carried by the cable, and are detected at a monitoring station 12 located remotely from the area where the light is modulated, preferably at a point above the sea level.

The transmitter 104 is suspended at an upper portion thereof 103 from a float 106 by a cable or other link 109 so as to retain the transmitter above the sea bed, the transmitter preferably being configured to transmit in an angled downward direction towards the cable (alternatively, the float may be integrally formed with the transmitter). This makes transmission to the cable easier than it would be were the transmitter on the sea bed.

The sensor 102 has a vibration detector in contact with the sea bed so as to detect seismic vibration. In response to detecting a seismic vibration, the sensor produces an electrical sensor signal from which the presence of a seismic event can be detected. This signal is coupled to the transmitter unit by an electrical conductor. The transmitter includes an electronic circuit for generating an acoustic signal in response to the received electrical sensor signal, which acoustic signal is transmitted as an acoustic wave by a transducer element of the transmitter unit. The acoustic wave is carried through the sea water and towards the optical cable. Light travelling along a waveguide of the optical cable undergoes a phase modulation by the acoustic wave from the transducer.

The transmitter 104 is tethered at a lower portion thereof to the sensor housing by a steel cable 105, which extend between the transmitter and the sensor housing. The sensor is weighted so as to keep the sensor resting against the sea bed. The weighting of the sensor and the buoyancy of the float 106 are chosen in dependence on one another, such that the sensor is sufficiently heavy to remain at the sea bed under the upward force provided by the float 106. In an alternative embodiment, a separate weight or other anchoring device is provided to retain the lower end of the cable 105 at a point on the sea bed. In either case, cable will be sufficiently short (for example, a few meters or a few tens of meters) such that the float remains below sea level. As a result of the upward force provided by the float on the one hand, and the downward restoring force of the tether (provided by the weighted sensor or other base) on the other hand, the transmitter will experience a stabilising force that will help the transmitter remain in the correct orientation. Preferably, the transmitter will include a main body member the transmitter element being secured to or within the main body member, the main body member being secured to the tether and float.

Figure 2:
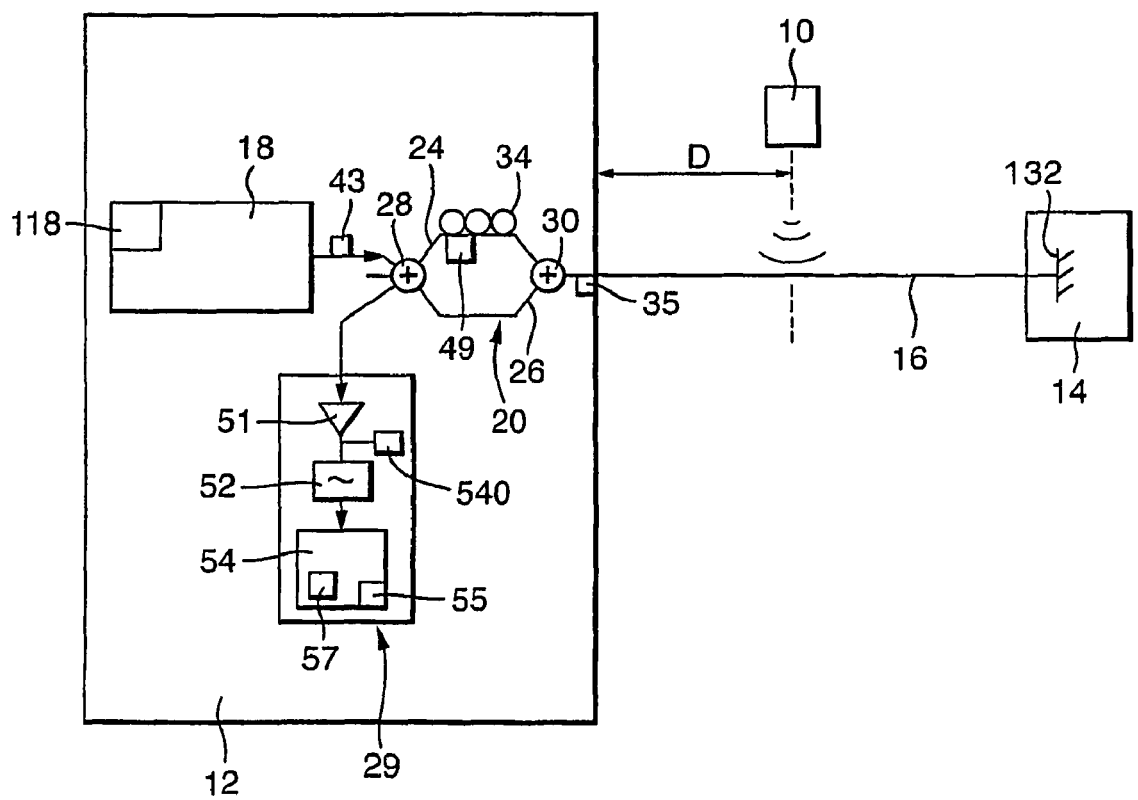
FIG. 2 shows a system for sensing acoustic waves with an optical waveguide link.

FIG. 2 shows a communications system, where the sensor/transmitter unit will be referred to as a "modulator arrangement". The monitoring station 12 is configured to receive acoustically modulated signals which have been applied to an optical link 16 using the modulator arrangement. Although the system in FIG. 2 is particularly effective in detecting modulated phase changes, another system could be used. Furthermore, properties of light other than phase may be modulated by the acoustic wave and subsequently detected by an alternative arrangement to that of FIG. 2.

In more detail, the monitoring station 12 includes an optical source 18 with a short coherence time (random phase changes in the output providing an irregular component to the signal). Sensing signals (waveform portions) from the optical source 18 are fed to an interferometer stage 20, here a Mach Zehnder interferometer having a first path 24 and a second path 26. The interferometer 20 includes a first coupling stage 28 for coupling optical radiation between the optical source 18, the first and second paths 24, 26, and a signal processing system 29. For light travelling in a forward direction, that is, away from the source, the first coupling stage 28 acts as a directional power (intensity) splitter, channelling light from the optical source 18 to each of the paths 24, 26, the power to each path being shared in a predetermined manner, here in a 50:50 ratio.

For each signal provided by the optical source 18 in a given time interval, that signal is copied such that there is a first copy and a second copy, the first and second copies being duplicates of one another. One copy travels along the first path 24 whilst the other copy travels along the second path 26. A second coupling stage 130 is provided for coupling light between the first and second paths 24, 26 and an output 135 of the interferometer, which output is connected to the optical link 16. For light travelling in the forward direction, the coupling stage 130 acts as a combiner, combining the light from the first and second paths and channelling this combined light to the interferometer output 135. The first path of the interferometer has a delay stage 134 for increasing the transit time of light travelling therealong between the first and second coupling stages 28, 130, such that the transit time for light travelling between the coupling stages 28, 130 is longer along the first path 24 than it is along the second path 26. For each signal produced by the optical source, the interferometer 20 serves to delay one of the signal copies relative to the other signal copy, the signal copies being transmitted onto the link 16 at different times to one another.

The additional (differential) delay imposed by the delay stage 134 is much greater than the coherence time of the optical source 18. Thus, when light travelling along the first and second paths is recombined by the second coupling stage 130, the interference between light travelling along the two paths averages out, such that on average (over a timescale much greater than the coherence time) the amplitude of light upon recombination at the second coupling stage 130 is of constant amplitude 18.

An outstation 14 is provided at a far end of the fibre. Reflector means, such as a reflecting surface 132 are provided at the outstation 14 for returning signals to the base station 12. For signals travelling in the return direction, that is, for return signals arriving at the interferometer 20 from the outstation 14, the second coupling stage 130 acts as a power splitter, in a similar fashion to the action of the first coupling stage 28 on light in the forward direction from the optical source 18. In this way, return signals are copied at the second coupling stage 130, one copy being channeled along the first path 24, whilst the other copy is channeled along the second path 26. The first coupling stage 28 then serves to combine light from the first and second paths in the return direction, channelling the interference signal (resulting from the combined light) to a signal processing system 29.

For each signal generated by the source 18, there are thus four duplicates of this signal: a non-retarded signal S0 which has traveled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will return to the first coupler stage 28 at the same time. In the absence of any disturbance in the fibre 16, these signals are copies of one another and the signals will interfere or otherwise combine constructively at the first coupler stage 28. However, if one of the pair of signals S1, S2 is modulated or otherwise modified by a disturbance along the fibre, the interference between the two signals will result in an interference signal having different spectral characteristics to the interference signal which would otherwise be produced in the absence of any disturbance to the fibre 16.

In the embodiments shown above, the transducer of the modulator arrangement generates a wave-like disturbance, which is coupled to an optical fibre. The result of this is that an elastic wave (preferably a bulk elastic wave) is launched into the transmission medium of the fibre. The elastic waves cause a local distortion of the glass structure, which changes the refractive index experienced by light travelling along the fibre. This change in refractive index caused a phase modulation in one or both of the (carrier) signals of a pair travelling along the link. However, the interference signal will be the result of interference between, on the one hand, a signal having been modulated by the disturbance at one time, and on the other hand, a signal modulated by the disturbance at another time, the two times being separated by the differential delay D. Thus, when an acoustic disturbance is applied to the optical link 16, the interference signal from the first coupling stage 28 will be a signal at the frequency of the applied acoustic disturbance. Likewise, any amplitude modulated applied to the acoustic signal will result in an interference signal with a corresponding amplitude modulation.

The frequency of the elastic wave may be a few kHz, but higher frequencies of a few MHz or more would allow for higher data rates.

The signal processing system includes: a photo-receiver 51 coupled to the first coupling stage 28 for converting optical signals into electrical signals; a filter 52 for receiving electrical signals from the photo-receiver 51 and filtering the electrical signals; and, a signal processing unit 54. If the information signal introduced by the modulator is an analogue signal, the processing unit 54 may simply be an amplifier, since the amplitude of the interference signal will vary in accordance with the amplitude of the applied acoustic signal. However, if the acoustic signal is amplitude modulated in a digital manner, the processing unit will be a digital system.

The light source may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 pico seconds. The radiation produced by the optical source will preferably be unpolarised, or alternatively a de-polarising unit 43 may be provided between the light source and the interferometer, for depolarising the light before the light is injected into the interferometer (the depolarising unit may be for example, a Fibre Lyot de-polariser). A depolariser 49 will preferably be provided in one of the paths of the interferometer, here, the first path, so that the polarisation of light from the first path combining in the return direction at the first coupler 28 is at least partially aligned with that of the light from the other path. Typically, the source will operate at a wavelength of between 1 micron and 2 microns, preferably around 1.31, 1.48 or 1.55 microns, in order to efficiently make use of standard telecommunications optical fibre, such fibre being configured to support single mode transmission at this wavelength. Typically, the fibre will have a single core of a diameter which is around 9 or 10 microns.

The first coupling stage 28, at the source side of the interferometer, will preferably be a 3×3 coupler (with some ports terminated), whereas the second coupling stage 130, at the transmission side, will preferably be a 2×2 coupler, with one port terminated. The 3×3 coupler is used in order to create a relative phase bias of 120° between the optical fields on its output ports. This can be used to improve the sensitivity of the interferometer.

It has been appreciated that the delay time D is related to the frequency response of the optical cable to phase modulation: that is, the lower the detectable acoustic frequency, the longer the delay time must be. As a very general rule, it is helpful if the delay time is longer than the inverse of the lowest detectable frequency. Preferably, the delay will thus be at least 100 micro seconds, although at least 30 micro seconds may be sufficient for some applications. The delay time will be particularly important if the sensing system is operating microphonically, such that the sensing signal is a microphonic representation of the seismic disturbance. However, if the sensor 102 is operating so as to provide a simple alert at a sufficiently high frequency, then lower values of delay may be used.

Sensor networks are in abundance throughout the world's oceans to monitor seismic events, the impact of global warming, sand bank drift, whale and fish stock migrations, and so on. The recent tsunami in the Indian ocean has brought into stark clarity the need to have the right sensors, in the right place, at the right time, particularly where lives are at stake.

Sadly the Indian ocean, and other risk zones, currently have no sensing capability, and there is now a growing global effort to address that. Key to the deployment of appropriate sensor networks is cost, and a key factor in that is the undersea infrastructure.

It is important to deploy sea-bed sensors in the optimum locations, many of which coincide with the routes of undersea fibre cables. Sea-bed sensors could be laid alongside the undersea cable and their data could be coupled to the fibres within the undersea cable via a clip-on device attached to the outer sheath.

A preferred approach in this invention is to convey data from the sensors to the undersea cable via an acoustic sonar (wireless) signal.

In the prior art, existing sea-bed sensors such as those used in the DART tsunami warning system around the Pacific Rim at website www.ndbc.noaa.gov/Dart/dart.shtml incorporate an acoustic data transmission system to convey sensor data to the surface buoy for onward transmission to the shore station via orbiting satellite. The distance between the sea-bed sensor and the surface buoy can be around 6 km in the deep ocean at website www.ndbc.noaa.gov/Dart/dart.shtml and the frequency of the acoustic sonar signal is typically 15-18 kHz, which is capable of supporting a data rate of a few 100 bit/s. In one of the embodiments of the invention, such frequencies are detectable with an optical cable link.

FIG. 1 shows a preferred arrangement in this invention to couple data wirelessly from sea-bed sensors (of the type used in the DART system) to an undersea fiber cable. The acoustic data sender on the sea-bed sensor, instead of directing the sonar signal upwards to the surface buoy, is angled towards the undersea fiber cable. In their normal configuration these acoustic data systems can transmit over distances of 6 km from sea floor to surface at website www.ndbc.noaa.gov/Dart/dart.shtml, therefore in principle the sea-bed sensors could be a similar distance from the undersea cable. However, in practice the clarity (turbidity) of the water at the sea floor will be less than at shallower depths due to sediment in suspension, and furthermore the undersea cable is likely to be buried to some degree by sediment that has settled on the sea floor (note—undersea fiber cables in the deep ocean are not buried when laid: that is only done in shallow regions such as continental shelves or run-ups to islands, where the cable may also be armored to mitigate damage from trawlers). For these reasons it would be preferable to locate the sea-bed sensor relatively close to the undersea cable, say within 1 km, and to suspend the acoustic data sender below flotation tanks some distance above the sea floor, say around 100-200 m. Such steps should ensure successful coupling of the sensor date to the fibers within the undersea cable.

Sensor data coupled to the fibers in this way will be received at the shore station and conveyed to the appropriate organizations (ref the DART system at website www.ndbc.noaa.gov/Dart/dart.shtml) via the global telecom network.

Benefits of this invention include . . .

To make greater and non-invasive use of the world's undersea fibre cable infrastructure.

To combine that infrastructure with proven sea-bed sensor technology to create a tsunami warning system that, in principle, would be more accurate, reliable and effective than those already in use, such as the DART system around the Pacific rim.

The preference in this invention to use existing sea-bed sensors that wirelessly couple data to the undersea cable is well suited to the necessary maintenance regime of these kind of sensors (ref the DART system at website www.ndbc.noaa.gov/Dart/brief.shtml). Sea-bed sensors need to be recovered at regular intervals (typically every 2 years for the DART system) to replace the battery, re-calibrate the sensor, upgrade the electronics etc. In the DART system this is done by sending a sonar signal from a surface ship down to the sea-bed sensor which releases the anchor (usually a heavy lump of concrete that forms the base of the sensor housing). The sensor then floats to the surface by virtue of flotation tanks where it is recovered, refurbished, then re-deployed with a fresh anchor. This procedure can take place entirely independent from the undersea fiber cable, which is essential.

One or more features of one or more embodiments of the invention can be summarised in terms of one or more of the following clauses: 1. A communication system including a transmitter unit having an acoustic transmitter for transmitting acoustic waves through a fluid medium; an optical link arranged such that the acoustic waves modulate light travelling along the link; and a monitoring station for detecting the modulation. 2. A communication system as specified in clause 1, wherein the acoustic waves contain an information signal, the monitoring station being configured to retrieve the information signal from the detected modulation 3. A communication system as specified in clause 1 or clause 2, wherein the fluid medium is a liquid medium 4. A communication system as specified in any of the preceding clauses, wherein there is provided a including a seismic vibration sensor, the seismic vibration sensor being operatively coupled to the transmitter unit for transmitting information relating to sensed seismic vibrations. 5. A communication system as specified in clause 4, wherein the seismic vibration sensor and the transmitter unit are configured for undersea operation, the fluid medium being sea water 6. A communication system as specified in clause 4 or clause 5, wherein means are provided for retaining the seismic sensor on the sea bed, and retaining the transmitter in a raised position relative to the sensor. 7. A communication system as specified in any of the preceding clauses, wherein a flotation system is provided for retaining the transmitter unit in a spaced apart relationship to the sea bed. 8. A communication system as specified in any of the preceding clauses, wherein a plurality of seismic sensors are provided about the path of the optical link 9. A communications system as specified in any of the preceding clauses, wherein the monitoring station is configured for receiving sensing signals previously transmitted onto the optical link, wherein the sensing signals are formed by pairs of signal copies, which copies of a pair have a time delay relative to one another, and wherein the monitoring station is configured to combine the respective signals of a pair so as to extract modulated data, if any, in the sensing signals. 10. A communications system as specified in clause 9, wherein the monitoring station includes an optical source for transmitting the sensing signals onto the optical link, the sensing signals being returned along the link to the monitoring station. 11. A communications system as specified in clause 10, wherein reflector means are provided to return the sensing signals. 12. A communications system as specified in any of clauses 9 to 11, wherein the time delay is greater than the inverse of the frequency of the modulation. 13. A communications system as specified in any of clauses 9 to 11, wherein the delay is at least 30 micro seconds, preferably at least 100 micro seconds. 14. A communications system as specified in any of clauses 9 to 13, wherein the monitoring station includes interferometer means having a path difference associated therewith for introducing a time delay between signal copies of a pair. 15. A communications system as specified in clause 14, wherein the interferometer means is used to temporally re-align the returned signal copies of a pair. 16. A communications system as specified in any preceding clause, wherein the or each sensor is in a spaced apart relationship to the optical link, residing preferably at least 50 or 100 m from the optical link 16. A communications system as specified in any preceding clause, wherein the optical link is a fibre cable, preferably an undersea fibre cable. 17. An subsea system for detecting seabed disturbances, the system including a seabed sensor for detecting seabed vibrations; a transmitter unit having an acoustic transmitter for transmitting acoustic waves through a fluid medium, the transmitter unit being coupled to the seabed sensor so that the transmitter can transmit acoustic signals indicative of the sensed seabed vibrations; and an optical link arranged such that the acoustic waves modulate light travelling along the fibre; and a monitoring station for detecting the modulation.

What is claimed is:

1. A seismic sensing system for sensing undersea seismic vibrations including:
    an undersea optical fibre cable on a seabed comprising an optical fibre providing an optical communications link;
    at least one modulator arrangement comprising:
    an undersea vibration sensor in contact with the sea-bed so as to sense seismic vibrations and arranged to produce an electrical sensor signal in response to detecting a seismic vibration from which the presence of a seismic event can be detected; and
    an undersea transmitter unit electronically coupled to the vibration sensor and arranged to transmit acoustic waves through sea-water, the transmitter including:
    an electronic circuit for generating an acoustic signal in response to receiving the electrical sensor signal, and
    a transducer element arranged to transmit said acoustic signal as an acoustic wave through the sea-water to couple to said optical fibre cable,
    wherein, the transmitter unit is arranged to be retained in a raised position relative to the seabed by a flotation arrangement so as to transmit said acoustic wave in an angled downward direction through the seawater towards said optical fibre cable; and
    wherein said acoustic wave modulates one or both of a pair of retarded copies of an optical signal applied to said optical link, one copy being retarded in a forward direction and the other copy being retarded in a reverse direction by a time-delay relative to said optical signal, from which modulation the presence of a seismic vibration can be inferred, wherein the time delay is related to the frequency response of the optical fibre cable to phase modulation caused by said acoustic signal coupling to said optical fibre cable.

2. An seismic sensing system as claimed in claim 1, wherein the flotation arrangement includes a buoyancy unit secured to the transmitter unit so as to urge the transmitter unit in an upward direction.

3. An seismic sensing system as claimed in claim 1, wherein there is provided a tether arrangement for securing the transmitter unit to the sea bed.

4. An seismic sensing system as claimed in claim 3, wherein the tether arrangement includes a weighted base.

5. A seismic sensor system as claimed in claim 1 further including: monitoring station for extracting information indicative of the seismic vibration from the phase modulated copies of said optical signal.

6. An seismic sensing system as in claim 1, wherein the flotation arrangement retains the transmitter unit in a position below sea level.

7. An seismic sensing system as in claim 2, wherein the buoyancy unit is maintained below sea level.

8. A seismic sensing system as claimed in claim 1, wherein the time delay is greater than the inverse of the frequency of the modulation.

9. A seismic sensing system as claimed in claim 1, wherein the time delay is selected to enable the sensing system to operate micro-phonically such that a sensing signal is a micro-phonic representation of the seismic disturbance.

10. A method of sensing an undersea seismic disturbance, including:
    sensing seismic vibrations on a sea bed using a vibration sensor, the vibration sensor being coupled to a transmitter unit;
    transmitting from the transmitter unit an acoustic signal from which the presence of a seismic vibration can be inferred, the transmitter unit being retained in a raised position relative to the sea bed; and
    detecting the acoustic signal at an undersea optical link on said seabed, wherein the acoustic signal causes a phase modulation of optical signals travelling along the optical link, wherein the optical signals are formed by pairs of signal copies, which copies of a pair have a time delay relative to one another, and wherein the respective signals of a pair are combined so as to extract modulated data, if any, in sensing signals from which the presence of a disturbance can be inferred,
    wherein the time delay is related to the frequency response of the optical link to the phase modulation caused by said acoustic signal coupling to said optical link.

11. A method of sensing an undersea seismic disturbance as claimed in claim 10, wherein the time delay is greater than the inverse of the frequency of the modulation.

12. A method as in claim 10, wherein the transmitter unit is retained in a position below sea level.

13. A method as in claim 10, wherein the transmitter unit is coupled to a float which is retained in a position below sea level.

14. A method as in claim 10, wherein the optical link is positioned on the sea bed.

15. A method of sensing an undersea seismic disturbance as claimed in claim 10, wherein the time delay of said optical sensing signals is longer for lower detectable acoustic frequencies.

16. A method of sensing an undersea seismic disturbance as claimed in claim 10, wherein the time delay is selected such that the sensing signals are a micro-phonic representation of the seismic disturbance.

17. A communication system for sensing underwater seismic vibrations including:
    an underwater seismic vibration sensor arranged in operation to electronically transmit a sensor signal providing information relating to seismic vibrations to an underwater transmitter unit;
    an underwater transmitter unit arranged to receive said transmitted electronic information from said seismic vibration sensor, the transmitter unit including:
    an electronic circuit for generating an acoustic signal in response to the received electronic sensor signal, and
    a transducer element for wirelessly transmitting acoustic waves underwater;
    an underwater optical link arranged such that the transmitted acoustic waves couple to said optical link and modulate light travelling along the link; and
    a monitoring station for detecting the modulation,
    wherein the light modulated comprises at least one a pair of retarded signal copies, one signal copy being retarded in a forward direction by a time delay, the other in a backward direction by said time delay, wherein the time delay of the signal copies is related to the frequency response of the underwater optical link to phase modulation generated by said acoustic waves transmitted by said transducer coupling to said underwater optical link.

18. A communication system as in claim 17, further comprising a float connected to the transmitter unit to retain the transmitter unit at a position above the bottom surface of the water but below the top surface of the water.

19. A communication system as in claim 18, wherein the float is maintained at a position above the bottom surface of the water but below the top surface of the water.

20. A communication system as in claim 17, wherein the transmitter unit is retained in a position above the optical link.

21. A method of sensing an undersea seismic disturbance, including:

sensing seismic vibrations on a sea bed using a vibration sensor, the vibration sensor being coupled to a transmitter unit;

transmitting from the transmitter unit at least one acoustic signal from which the presence of a seismic vibration can be inferred, the transmitter unit being retained in a raised position relative to the sea bed; and detecting the acoustic signal at an optical link;

wherein the acoustic signal causes a phase modulation of optical signals travelling along the optical link;

wherein the optical signals are formed by pairs of signal copies, which copies of a pair have a time delay relative to one another, and wherein the respective signals of a pair are combined so as to extract modulated data, if any, in the sensing signals from which the presence of a disturbance can be inferred; and wherein the time delay is greater than the inverse of the frequency of the modulation.

\* \* \* \* \*